Patented June 23, 1931

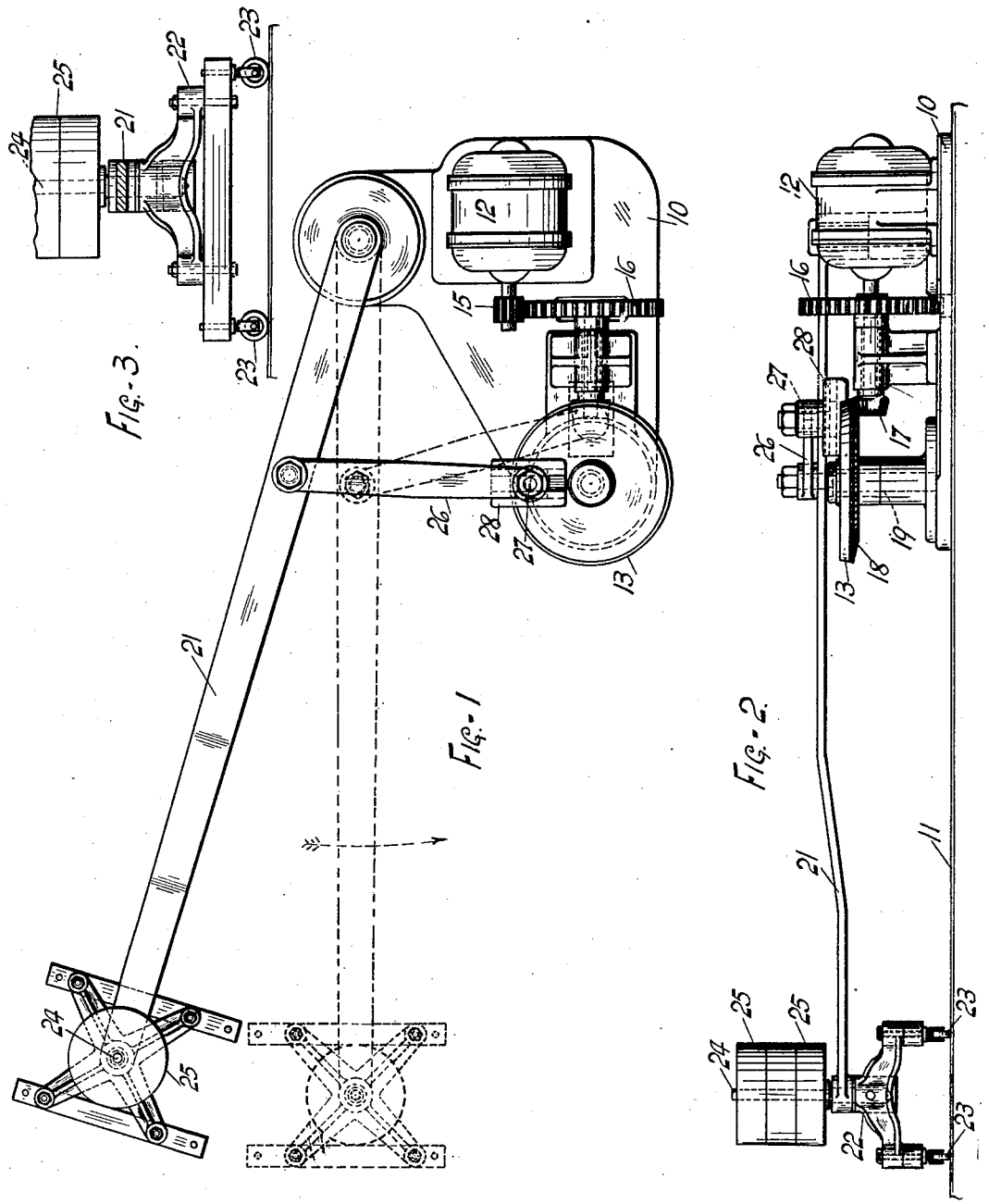

1,811,285

UNITED STATES PATENT OFFICE

HORACE D. STEVENS, OF AKRON, OHIO, ASSIGNOR TO THE FIRESTONE TIRE AND RUBBER COMPANY, OF AKRON, OHIO, A CORPORATION OF OHIO

CASTER TESTING DEVICE

Application filed October 23, 1926. Serial No. 143,717.

This invention relates to devices for testing rollers, such as caster rollers of molded, vulcanized rubber or other material.

The general purpose of the invention is to provide a testing device for use in ascertaining the wearing qualities of such casters or rollers and adapted to subject them substantially to the conditions under which they operate in use, including the action thereon when the object supported thereby is caused to change its direction of movement.

The foregoing and other objects are obtained by the device illustrated in the accompanying drawings and described below. It is to be understood, that the invention is not limited to the specific form thereof shown and described.

Of the accompanying drawings:

Figure 1 is a plan of apparatus embodying the invention showing the device in one position.

Figure 2 is an elevation thereof, showing the device in another position; and

Figure 3 is a detail elevation of the caster supported weight carriage.

Referring to the drawings, the numeral 10 designates a base which may be mounted on a floor of concrete, wood, etc., indicated at 11, on which the wear of the rollers may be tested. On base 10 is a suitable motor 12 arranged to drive a disc 13 through gears 15, 16, 17 and 18, disc 13 being journaled on vertical bearing 19.

Pivoted vertically on base 10 is an arm 21 extending horizontally therefrom and having pivoted or swiveled to its outer end a carriage 22, the pivotal axis being eccentric with respect to the carriage. The latter is adapted to be supported by caster rollers 23, 23 to be tested, and is provided with a pin 24 thereon for receiving circular weights 25, 25 thereover to support the weights on carriage 22.

Arm 21 is oscillatable in a horizontal plane by means of a link 26 connecting said arm with a pin 27 radially adjustable on disc 13 in a grooved member 28, so that the amplitude of oscillation of arm 21 may be varied.

In operation, the caster rollers 23 to be tested, are applied to carriage 22 as will be understood, and sufficient weights 25, 25 are mounted on carriage 22 to provide the desired load on the casters 23. The pin 27 is adjusted to produce oscillations of the predetermined magnitude and motor 12 is then started. Arm 21 accordingly pulls carriage 22 back and forth over the floor surface and the carriage 22, due to its eccentric mounting, swings about as arm 21 reaches its extremes of oscillation so that the longer portion of the carriage follows behind pin 24, as indicated by the dotted lines in Figure 1, thus subjecting the casters to actions similar to those accompanying changes of direction of movement of an object which they support in use.

Modifications may be resorted to without departing from the spirit thereof or the scope of the appended claims.

What is claimed is:

1. A device for testing casters or the like, including a carriage adapted to be supported by the casters to be tested, means for supporting one or more weights on the carriage to vary the load on the casters, an arm for moving the carriage to and fro in an arcuate path, said carriage being swiveled to the arm eccentrically with respect to the carriage, and means for oscillating the arm.

2. A device for testing casters or the like, including a carriage adapted to be supported by the casters to be tested, means for supporting one or more weights on the carriage to vary the load on the casters, a fixed pin, an arm pivotally secured to said fixed pin and to said carriage, and means for oscillating the arm.

3. A device for testing casters or the like, including a carriage adapted to be supported by the casters to be tested, an arm for moving the carriage to and fro in an arcuate path, said carriage being swiveled to the arm, and means for oscillating the arm.

4. A device for testing casters or the like, including a carriage adapted to be supported by the casters to be tested, an arm for moving the carriage to and fro, said carriage being swiveled to the arm eccentrically with respect to the carriage, and means for oscillating the arm whereby the eccentric mounting of the carriage will cause a partial rotation of the carriage upon each change of direction of movement of the oscillating arm.

5. A device for testing casters or the like, including a carriage adapted to be supported by the casters to be tested, means for providing a variable load on the casters, an arm for moving the carriage to and fro, said carriage being swiveled to the arm eccentrically with respect to the carriage, and means for oscillating the arm.

6. A device for testing casters or the like, including a carriage adapted to be supported by the casters to be tested, an arm for moving the carriage to and fro said arm swinging in a plane parallel with the plane of the casters, said carriage being pivoted to said arm eccentrically with respect to the carriage.

7. A device for testing casters, including a carriage adapted to be mounted on the casters to be tested and to receive determinate loads thereon, an arm and means operating through said arm for moving the carriage in changing directions, said carriage being pivoted eccentrically to said arm to swing thereon when the direction of movement of the carriage changes.

8. A device for testing casters, including a carriage adapted to be mounted on the casters to be tested, an arm and means operating through said arm for moving the carriage in changing directions, said carriage being rotatable with respect to said arm, whereby the carriage may swing about its axis when said means changes the direction of movement of the carriage.

HORACE D. STEVENS.